United States Patent

[11] 3,601,572

| [72] | Inventors | John M. Check<br>Ann Arbor;<br>Gary F. Rupert, Ypsilanti, both of, Mich. |
|---|---|---|
| [21] | Appl. No. | 501,910 |
| [22] | Filed | Oct. 22, 1965 |
| [45] | Patented | Aug. 24, 1971 |
| [73] | Assignee | Raycon Corporation<br>Ann Arbor, Mich. |

[54] ELECTRODE-REPLENISHING APPARATUS FOR ELECTRICAL DISCHARGE MACHINING
15 Claims, 9 Drawing Figs.

| [52] | U.S. Cl. | 219/69 V,<br>77/3, 219/69 C, 219/69 E, 219/69 M |
|---|---|---|
| [51] | Int. Cl. | B23p 1/08 |
| [50] | Field of Search | 219/19 T,<br>25 T, 69, 69 C, 69 E, 69 G, 69 S, 69 V, 518, 130,<br>69 F, 69 M; 77/3 |

[56] References Cited
UNITED STATES PATENTS

| 752,908 | 2/1904 | Lawles | 77/3 UX |
| 2,337,341 | 12/1943 | Miller et al. | 219/69 V |
| 1,080,493 | 12/1913 | Smith | 219/25 T UX |
| 2,773,968 | 12/1956 | Martellotti et al. | 219/69 V |
| 2,778,925 | 1/1957 | Gross et al. | 219/69 E |
| 2,818,491 | 12/1957 | Matulaitis | 219/69 G |
| 2,906,859 | 9/1959 | Steele | 219/130 |
| 2,980,787 | 4/1961 | Bruma | 219/69 C |
| 3,098,148 | 7/1963 | Piot et al. | 219/69 E |
| 3,125,700 | 3/1964 | Bentley et al. | 219/69 G X |
| 3,247,599 | 4/1966 | O'Connor | 219/69 S X |

*Primary Examiner*—R. F. Staubly
*Attorney*—Olsen and Stephenson

ABSTRACT: Electrical discharge machining apparatus utilizing a wire electrode and a re-feed mechanism operable to replenish the electrode following each machining pass. The mechanism includes means for sensing electrical contact between the workpiece and the electrode to determine the amount of electrode fed after each operation of the apparatus. The apparatus also can form true holes which are larger in diameter than the electrode by employing structure for rotating a workpiece while the electrode is fed axially thereof and held obliquely to the workpiece axis.

PATENTED AUG 24 1971
3,601,572
SHEET 1 OF 3
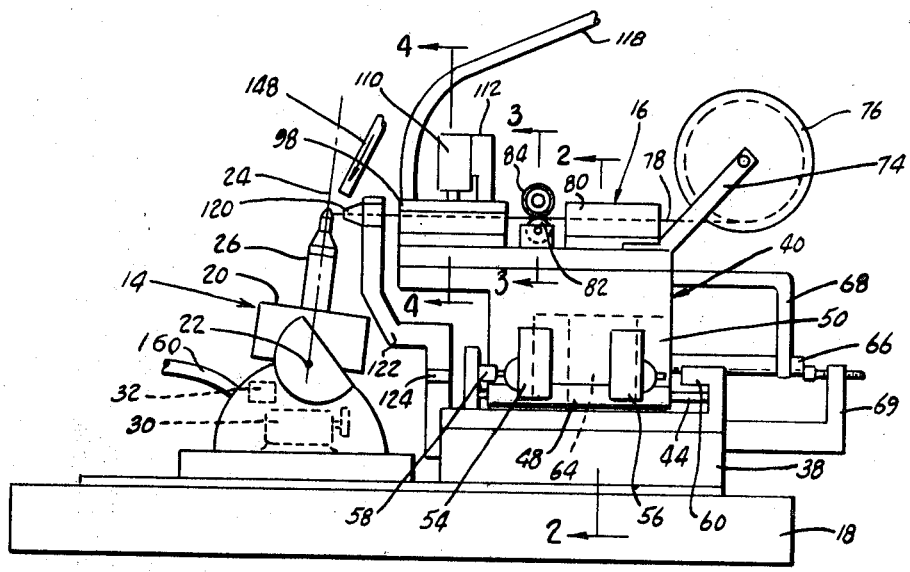
FIG.1
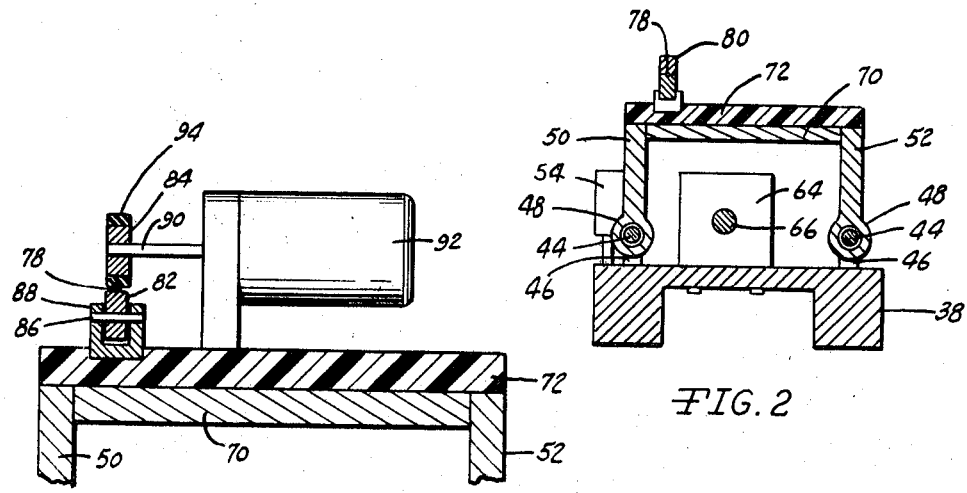
FIG.3
FIG.2
INVENTORS
JOHN M. CHECK
GARY F. RUPERT
BY *Olsen and Stephenson*
ATTORNEYS

PATENTED AUG 24 1971

INVENTORS
JOHN M. CHECK
GARY F. RUPERT

BY *Olsen and Stephenson*
ATTORNEYS

INVENTORS
JOHN M. CHECK
GARY F. RUPERT

BY Olsen and Stephenson
ATTORNEYS

ELECTRODE-REPLENISHING APPARATUS FOR ELECTRICAL DISCHARGE MACHINING

This invention relates generally to electrical discharge machining and more particularly to the method and apparatus for feeding an electrode relative to a workpiece.

Electrical discharge machining has been used in a wide variety of machining applications. However, the techniques for machining small holes have not been entirely satisfactory, particularly when several machining operations are to be performed automatically in sequence on a workpiece that is indexed between successive machinings. Difficulties are encountered where the holes are to have a diameter on the order of 0.006 of an inch and they are machined by an electrode in the form of a very small diameter wire, for example a wire whose diameter is on the order of 0.005 of an inch. Substantial erosion of the electrode wire occurs during the machining of each hole and thus after each hole is machined the electrode wire that eroded must be replenished. Generally prior techniques for refeeding the electrode wire are either time consuming or they do not accurately reposition the wire relative to the workpiece. These deficiencies are particularly disadvantageous where a sequence of machining operations are to be performed automatically. By way of example if a given length of electrode wire is replenished after each machining operation any error in the refeeding may accumulate over several machining operations and cause defective holes during subsequent machining. Thus it is desirable to initiate the machining of each hole with the electrode at a predetermined fixed relation to the workpiece so that positioning errors do not accumulate over several machining operations. To achieve this result it is also desirable, if not essential, to have precise control over the wire refeeding so that the wire can be positioned accurately and precisely relative to the workpiece. Additionally, prior methods and apparatuses for machining small holes have not been economical to use for machining holes of different sizes.

The objects of the present invention are to provide improved methods and apparatuses for electrical discharge machining.

Other objects of the present invention are to provide an electrical discharge apparatus that achieves effective small hole machining; that is simple in construction and operation; that is particularly suited to automatic sequential machining operations; that replenishes electrode material automatically and in a simple and effective manner; that provides a substantially linear and continuous refeed of a wire electrode; and that accurately refeeds the electrode to a precise predetermined relation to the workpiece before each machining operation.

Further objects of the present invention are to provide controls for operating an electrical discharge machine automatically to achieve the aforementioned advantages.

Other objects of the present invention are to provide an electrical discharge machining apparatus that is capable of machining different-diameter holes efficiently and economically and without using wire electrodes of different sizes.

Still further objects of the present invention are to provide a method for machining holes having diameters greater that the diameter of an electrode wire and for machining holes of different diameters using an electrode wire of one diameter.

Other objects, features and advantages of the present invention will become apparent in connection with the following description, the appended claims and the accompanying drawings in which:

FIG. 1 is a side elevational view of an electrical discharge machining apparatus of the present invention applied to automatic machining of small holes;

FIG. 2 is a vertical sectional view taken on the line 2—2 of FIG. 1;

FIG. 3 is a vertical sectional view taken on the line 3—3 of FIG. 1;

Figure 7:
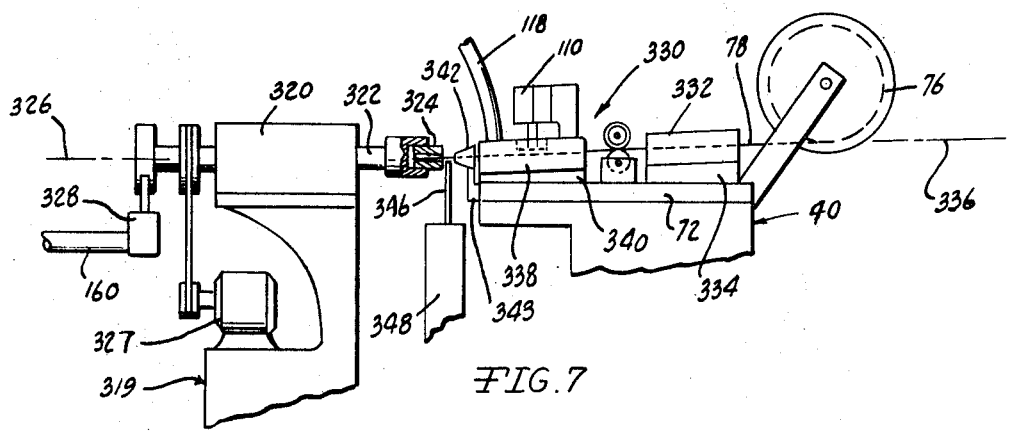
FIG. 7 is a side elevational view illustrating another embodiment of the present invention for machining holes having a diameter greater than the diameter of the wire electrode.
Figure 5:
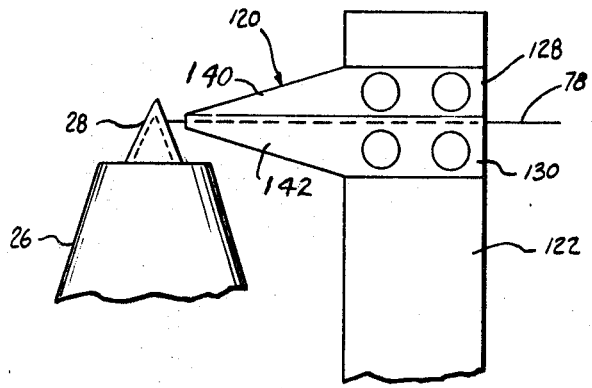
FIG. 5 is an enlarged fragmentary view of a guide for a wire electrode in the apparatus shown in FIG. 1.
Figure 6:
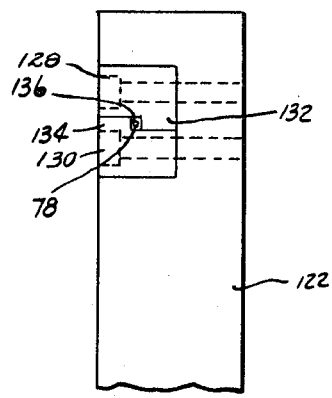
FIG. 6 is an end view of the guide taken from the right as viewed in FIG. 5.
Figure 4:
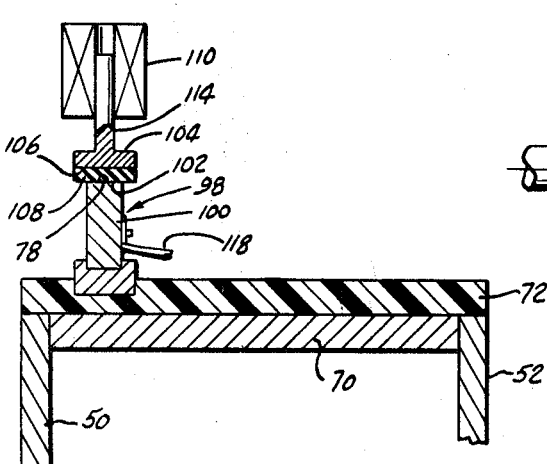
FIG. 4 is a vertical sectional view taken on the line 4—4 of FIG. 1.

Referring to the apparatus of the present invention illustrated in FIGS. 1–6, a work-indexing assembly 14 and an electrode-feeding assembly 16 are mounted on a flat horizontal bed 18. The indexing assembly 14, per se, is not an essential feature of the present invention and will be described only to the extent necessary to explain electrical discharge machining of the present invention. The indexing assembly 14 includes a work holder 20 and suitable means for mounting the holder for movement about a horizontal axis 22 and about a generally orthogonal axis 24. Fastened in the holder 20 is a workpiece 26 illustrated as a nozzle having a hollow tip 28 (FIG. 5) in which small holes are to be machined. During a machining operation the holder 20 and the workpiece 26 are indexed about the axis 24 by a motor 30 (FIGS. 1 and 9) to sequentially machine generally radial holes in the tip 28 at locations spaced circumferentially about the axis 24. Motor 30 indexes the holder 20 by means of a mechanical drive (not shown). Also included in the work-indexing assembly 14 is a limit switch 32 that is tripped by the mechanical drive when the work holder 20 moves into the last index position after initiation of the machining cycle for the last hole.

The electrode assembly 16 comprises a flat base 38 which is mounted on bed 18 and preferably is arranged to be moved horizontally by suitable means (not shown) so that the indexing assembly 14 and the electrode assembly 16 can be moved apart to facilitate setting up a machining operation. A carriage 40 is supported on the base 38 by a pair of guide rods 44 each of which is fastened on base 38 by two end brackets 46. Each rod 44 slides in a guide 48 on the bottom of each sideplate portion 50, 52 of the carriage 40. Thus the carriage 40 is mounted for movement relative to the base 38 in opposite horizontal directions, from right to left as viewed in FIG. 1 to advance the carriage toward workpiece 26 and from left to right to retract the carriage from the workpiece. Two limit switches 54, 56 fastened on the sideplate 50 project laterally outwardly from the carriage 40. The limit switch 54 is mounted on the forward end of the carriage 40 and is arranged to be operated by a stop arm 58 fastened on the base 38. Limit switch 54 and the arm 58 serve as a depth control by detecting a forward travel limit of carriage 40 and initiating retraction of the carriage when a hole has been machined in workpiece 26 to a predetermined depth. Switch 56 is mounted on plate 50 adjacent the rear end of carriage 40 and is arranged to be operated by a stop arm 60 fastened on the base 38 when carriage 40 reaches its rear travel limit. The switch 56 and arm 60 initiate refeeding of an electrode wire in a manner to be described after the wire has been retracted from the workpiece 26 at the completion of each hole-machining operation. In the preferred embodiment either the switches 54, 56 or the arms 58, 60 are mounted for limited horizontal adjustment so that the machining depth and the refeed initiation can be adjusted.

A power cylinder 64 moving the carriage 40 is also fastened on the base 38 in the space between the sideplates 50, 52. Cylinder 64 includes the usual piston rod 66 which extends rearwardly from the cylinder and is fastened at its rear end on a bracket 68 which in turn is fastened at its upper end on the carriage 40. Movement of the piston rod 66 in forward and rearward directions produces corresponding motions of the carriage 40. A rear carriage stop 69 is also fastened on the rear end of base 38 and is disposed so as to engage the carriage 40 and limit rearward travel of the carriage. The carriage 40 also includes a flat top plate 70 which extends laterally between the sideplates 50, 52 and fastened on the top of plate 70 is a thick plate 72 made of electrical insulating material. A frame 74 fastened on the rear end of plate 72 extends upwardly and rearwardly from the plate 72 and rotatably supports a spool 76 on which a long continuous electrode wire 78 is wound. The wire 78 leaves the bottom of the spool as viewed in FIG. 1 and the wire is wound on the spool so that the wire is fed in a direction toward the workpiece 26, toward the left as viewed in FIG. 1 when the spool rotates in a clockwise direction. After leaving the spool 76, the wire 78 passes through a guide 80 which is fastened on the plate 72 to support wire 78 above the plate and direct the wire between a pair of wheels 82, 84. The diameter of a passageway through guide 80 is large enough so as not to restrain movement of the wire 78 through the guide and the length of guide 80 is sufficiently long and the diameter of the passageway in the guide is sufficiently small so that the guide straightens the wire 78 before it passes to the wheels 82, 84.

The lower wheel 82 is an idler wheel and is formed of hard material in the preferred embodiment. Wheel 82 is journaled on a shaft 86 which is supported on plate 72 by a bracket 88. The upper wheel 84 is disposed above and in vertical alignment with wheel 82 and has its drive shaft 90 driven by a motor 92 which is fastened on the plate 72. Wheel 84 has a resilient rubber tread 94 and the wheel 84 and the motor 92 are disposed relative to wheel 82 such that the tread 94 is preloaded in radial compression where it engages the lower wheel 82 to assure tight frictional driving engagement with the wire 78. The wheels 82, 84 feed wire 78 from spool 76 toward workpiece 26 during a refeeding stage of operation. The wire 78 is fed by wheels 82, 84 to a clamping device 98 (FIGS. 1 and 4) mounted on plate 72 at the forward end of carriage 40. The clamping device 98 comprises a lower block 100 having a flat upper face 102 and an upper block 104 having a flat lower face 106 which is covered with a rubber pad 108. A solenoid 110 is supported above the upper block 104 by a support 112 which is fastened on the plate 72 and the solenoid 110 has an armature 114 fastened at its lower end to the upper block 104. Solenoid 110 is normally biased in a lowered position to maintain the block 104 tightly against the block 100 and firmly clamp the wire 78. When solenoid 110 is actuated the block 104 is raised to permit wire 78 to be fed toward workpiece 26 by wheels 82, 84. An electrical supply conductor 118 is electrically connected to the block 100 and the block 100 is formed of electrical conducting material so that the electrode wire 78 can be energized with machining current when the wire is clamped between blocks 100, 104. The electrode wire 78 extends forwardly from the clamp 98 through another guide 120 (FIGS. 1 and 5) which is mounted on the base 38 by a bracket 122. The bracket 122 has a segment 124 of electrical insulating material to electrically isolate the guide 120 and thus the wire 78 from the base 38.

In the preferred embodiment the guide 120 comprises a pair of elongated blocks 128, 130 each of which has a longitudinal shoulder 132, 134, respectively, which are offset vertically and laterally so that when the blocks are assembled together on the bracket 122 a small passageway 136 extending horizontally through the guide is provided for the electrode wire 78. Guide 120 is constructed in two pieces so that the guide can be disassembled to position the electrode wire 78 in the guide. Each of the blocks 128, 130 has a tapered forward portion 140, 142, respectively, projecting toward workpiece 26 so that the guide can be positioned closely adjacent workpiece 26 with little likelihood of sparking between the guide and the workpiece. The guide 120 is relatively long and serves to stabilize the electrode wire 78 near the workpiece 26 both during refeed of the wire 78 by the wheels 82, 84 and while the wire is advanced by carriage 40 during a machining operation. By way of illustration, for small holes where wire 78 may have a diameter of 0.005 of an inch, the wire may be a tungsten allow. A length of this wire projecting from guide 120 is self-supporting adjacent the workpiece 26. Dielectric fluid is supplied to the electrode wire 28 and the workpiece 26 by tubing 118.

Figure 8:
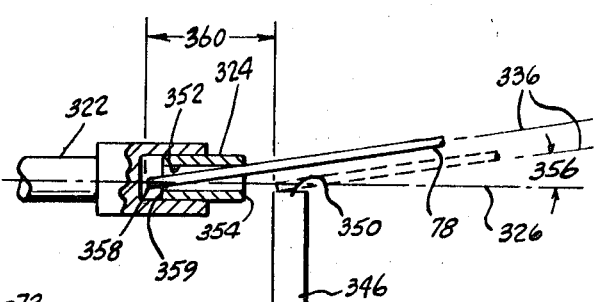
FIG. 8 is an enlarged view illustrating the relationship of the electrode wire to the workpiece in the apparatus illustrated in FIG. 7.
Figure 9:
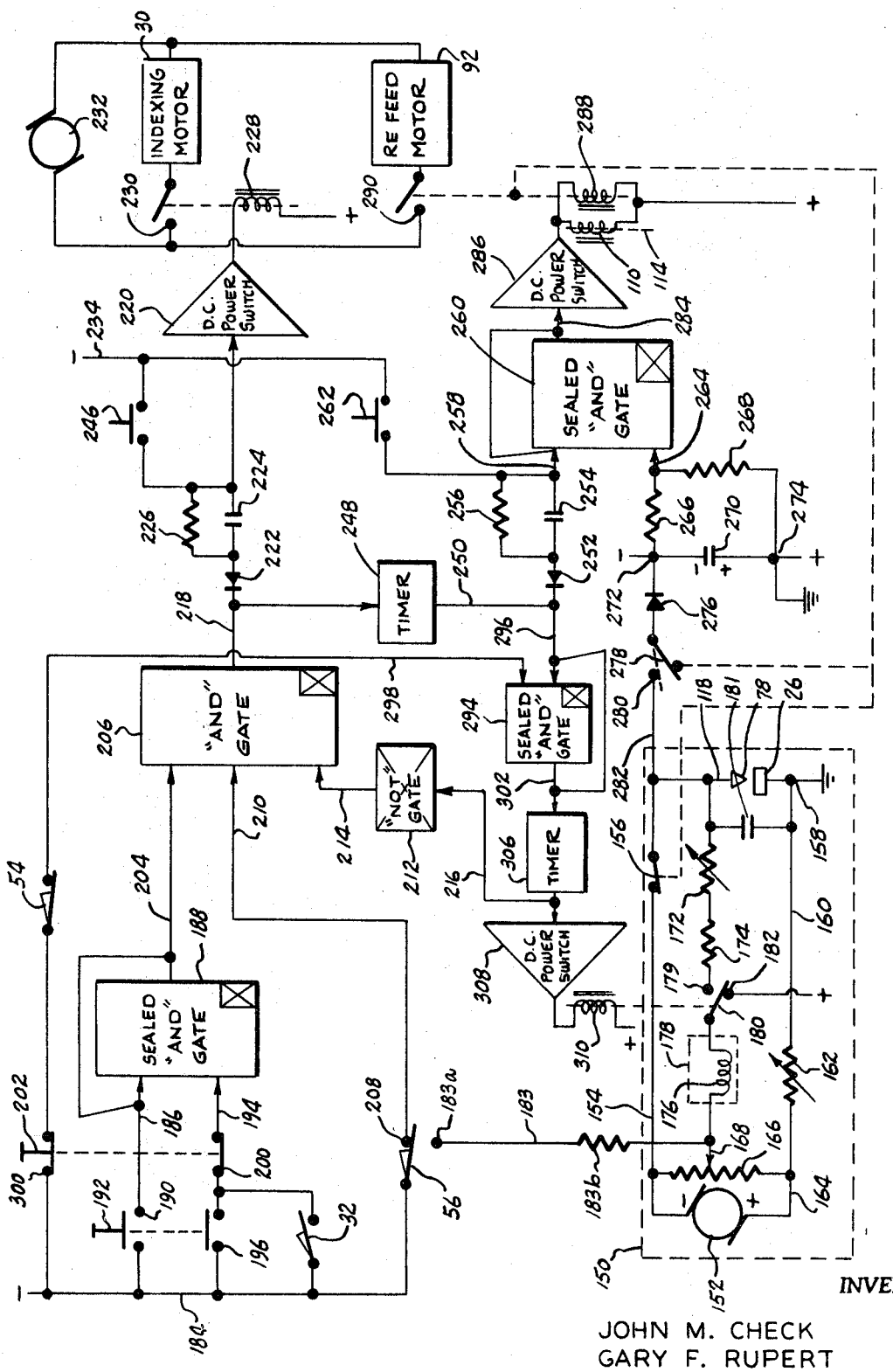
FIG. 9 is a circuit diagram, partly in block form, of an automatic control for the apparatus shown in FIGS. 1–6.

FIG. 9 illustrates a power supply circuit 150 for controlling discharge between the electrode wire 78 and the workpiece 26 together with a control for automatically operating the apparatus illustrated in FIG. 1. The power supply circuit 150 generally comprises a direct current generator 152 having a negative supply conductor 154 that is electrically connected to the electrode wire 78 through the conductor 118 and block 100 (FIG. 1). Normally closed contacts 156 are connected in conductor 154 to disconnect electrode wire 78 from generator 152 during refeed. The workpiece 26 is grounded at a terminal 158 which is also connected to the positive side of generator 152 through a supply conductor 160 (FIGS. 1 and 8), a variable resistor 162 and a conductor 164. Resistor 162 controls the charging current for capacitor 181 and thus controls the discharge at the gap between the electrode wire 78 and workpiece 26. For machining small holes with a 0.005-inch-diameter wire, the source may be 150 volts and typical machining currents will be on the order of 1.5 amps. Connected between conductors 154, 164 across the generator 152 is a potentiometer 166 having an adjustable wiper arm 168. A variable resistor 172, a second resistor 174 and the control coil 176 of a servo valve 178 are arranged to be connected in series between the conductor 118 and the wiper arm 168 through a contact 179 of a solenoid-operated switch arm 180. A storage capacitor 181 is connected directly across the electrode wire 78 and terminal 158 to discharge through the gap in a conventional manner. Resistor 174 limits the current in the coil 176 whereas the resistor 172 controls the sensitivity of the servo valve 178. The servo valve 178 controls the power cylinder 64 which in turn controls the motion of carriage 40 and the position of the wire electrode 78. The switch arm 180 is also arranged to energize the coil 176 through a positive supply contact 182 and a lead 183 which is connected between arm 168 and coil 176 and to contact 183a of the rear travel limit switch 56 and cause retraction of carriage 40 as will be described. A resistor 183b in conductor 183 limits current through conductor 183 and coil 176. The connection of the potentiometer 166, the control coil 176, the electrode wire 78 and workpiece 26 maintains a predetermined gap between the electrode wire 78 and the workpiece 26 during the machining operation.

The control circuit for the machining apparatus illustrated in FIG. 1 comprises a negative supply conductor 184 which is arranged to be connected to one input line 186 of sealed "AND" gate 188 through normally open contacts 190 of a start switch 192. The conductor 184 is also arranged to be connected to a second input line 194 of the gate 188 through normally open contacts 196 of the start switch 192 and normally closed contacts 200 of a stop switch 202. Line 194 is also connected to conductor 184 through contacts 200 and normally closed contacts of the index limit switch 32 (FIGS. 1 and 9). The gate 188 is a conventional logic circuit which will produce an output at its output line 204 when an input is present at lines 186 and 194, after which the input may be removed from line 186 and gate 188 will not turn off until the input is removed from line 194. The output from gate 188 is fed by a line 204 to an "AND" gate 206. The gate 206 can also receive an input from the conductor 184 through a contact 208 of the rear travel limit switch 56 (FIGS. 1 and 9) and through an input line 210. A third input is also applied to gate 206 from a "NOT" gate 212 through a line 214. Gate 212 is a conventional logic circuit which has an output at line 214 until an input is applied to gate 212 on an input line 216. The gate 206 is also a conventional logic circuit which will provide an output at a line 218 when inputs are present at all three lines 204, 210, 214. The output at line 218 is coupled to a direct current power switch 220 through a rectifier 222 and a capacitor 224 which is shunted by a resistor 226. The switch 220 develops an amplified output which is applied to a solenoid 228 having normally open contacts 230 arranged to connect the indexing motor 30 (FIGS. 1 and 9) to a power source 232. The solenoid 228 can also be energized from a negative supply conductor 234 through a switch 246 and the power switch 220 for manual indexing. Rectifier 222 isolates line 218 from conductor 234 and the capacitor 224 and the resistor 226 shape the input to switch 220. Momentary closing of contacts 230 initiates indexing and the motor will complete an indexing operation under the control of conventional means (not shown).

Also connected to line 218 is an electronic timer 248 which provides an output at a line 250 a predetermined time interval after the timer receives an input on line 218. The output at line 250 is coupled through a rectifier 252, a capacitor 254 and shunt resistor 256 and through a line 258 to a sealed "AND" gate 260. The line 258 is also arranged to be connected to the negative conductor 234 by a switch 262 to permit manually controlled refeeding of wire 78. The gate 260 also receives an input at line 264 from a voltage divider comprising resistors 266, 268 which are connected across a capacitor 270. Capacitor 270 is in turn connected across a negative terminal 272 and a positive terminal 274 of a direct current source (not shown) so the capacitor 270 is normally charged to the polarity designated in FIG 9. The negative terminal 272 is connected through a rectifier 276, a normally open switch arm 278, a switch contact 280 and a conductor 282 to the electrode wire 78. The gate 260 will provide an output at line 284 when an input is present at lines 258, 264 after which the input may be removed from line 258 and gate 260 will not turn off until the input is removed from line 264. Timer 248 provides a delay to assure that indexing by motor 30 is completed before refeeding is initiated by gate 260. The output at line 284 is applied through a direct current power switch 286 to a solenoid 288 and to the solenoid 110. Solenoid 288 has normally open contacts 290 which close when solenoid 288 is energized to actuate the refeed motor 92 (FIGS. 3 and 9). Solenoid 288 also opens the normally closed contacts 156 to disconnect the generator 152 and also closes the arm 278 on contact 280. Solenoid 110 operates the clamping device 98 to raise block 104.

When the carriage 40 is retracted from the workpiece 26 capacitor 270 will be charged to the polarity shown and an input will be present at the line 264. However, as the electrode wire 78 is fed toward the workpiece 26 by the refeed motor 92 and the wheels 82, 84, when the electrode wire 78 reaches a predetermined distance from the workpiece 26, capacitor 270 discharges through rectifier 276, switch arm 278, contact 280, and the gap between the electrode and the wire to remove the input at lead 264. Spark discharge of capacitor 270 occurs because gap spacing reaches a value so that the voltage on capacitor 270 initiates a spark discharge following the negative-resistance characteristic of the arc. Gate 260 turns off to release solenoids 110, 228 which release the clamp 98, turn motor 92 off, close contact 156 and open contact 280. The exact position of the electrode wire 78 relative to the workpiece 26 at which capacitor 270 discharges may be controlled by proper selection of the voltage at terminals 272, 274. Resistors 266 and 268 are a voltage divider across capacitor 270 that establishes a voltage suitable for the gate 260. Thus the refeed motor 92 can be deenergized when the electrode wire 78 actually touches workpiece 26 or at other selected locations of the electrode wire 78 in close proximity to the workpiece 26. In the preferred embodiment refeed is slow enough to permit the wire 78 to be stopped when it is only several millionths of an inch from workpiece 26. This is achieved in part with a short time constant for discharge of capacitor 270 to provide rapid turn off of switch 286. A short time constant of capacitor discharge is assured because of the low resistance of the gap, that is, the negative-resistance characteristic of the gap. A relatively long time constant for recharging capacitor 270 is desired so that the gate 260 can sense the low gap voltage which is necessary to turn gate 260 off. Although a capacitor 270 has been disclosed in the preferred embodiment for sensing the position of the electrode wire 78 relative to the workpiece 26, other electrical, magnetic, and electromagnetic devices can also be used to sense the relative positions of the wire and the workpiece and terminate refeeding by the motor 92. The techniques described can also be used to position an electrode relative to the workpiece for purposes other than replenishing eroded electrode material.

Referring again to the construction and operation of the control, the output from timer 248 at line 250 is also fed to a sealed "AND" gate 294 through an input line 296. Gate 294 also receives an input on line 298 which is connected to the conductor 184 through the normally closed depth control limit switch 54 (FIGS. 1 and 9) and through the normally closed contacts 300 of the off switch 202. Gate 294 provides an output at line 302 when inputs are present at lines 296, 298 and will stay on after the input at line 296 is removed until either contacts 300 or switch 54 opens to remove the input at line 298. The output at line 302 is fed to an electronic timer 306 which after a predetermined time delay energizes a direct current power switch 308 which in turn energizes a solenoid 310. The output of timer 306 is also applied by line 216 to the "NOT" gate 212 to remove the input at line 214 of the "AND" gate 206 and thus assure that indexing and refeeding cannot be reinitiated by the gate 206. Timer 306 assures that solenoid 310 will not be energized until refeeding by motor 92 is completed. Solenoid 310 closes switch arm 180 on contact 179 to energize the coil 176 and initiate automatic control by the servo valve 178 of the gap between electrode wire 78 and the workpiece 26 while the carriage 40 advances the wire to machine a hole in workpiece 26. Solenoid 310 remains energized until carriage 40 reaches its forward travel limit and when the carriage actuates the depth control limit switch 54, the switch opens to remove the input at line 298 on the gate 294 and timer 306, switch 308 and solenoid 310 and solenoid 310 turn off. With solenoid 310 deenergized, the contact arm 180 moves into engagement with the positive contact 182 to connect the control coil 176 across contact 182 and the negative conductor 184 through the rear travel limit switch 56, contact 183a and conductor 183. Servo valve 178 is then energized to retract carriage 40 toward the right as viewed in FIG. 1. When the carriage 40 reaches its rear travel limit, switch 56 is actuated by arm 60 into engagement with contact 208 to disconnect the coil 176 from conductor 184 and apply an input to the gate 206 through line 210.

At the beginning of a machining operation, workpiece 26 will be fastened in the work holder 20 which will be in an index position of the last hole that is to be machined with the index limit switch 32 still open. The carriage 40 will be fully retracted against stop 69 and the rear travel limit switch 56 (FIGS. 1 and 9) will be operated by the stop 60 to close contact 208. Gate 206 will have inputs at its leads 210, 214. When the start switch 190 is actuated, the gate 188 receives an input at line 186 through contacts 190 and also receives an input at line 194 through contacts 196 and the closed contacts 200 of the stop switch 202 to develop an output at line 204 which enables the "AND" gate 206 to provide an output at line 218. Switch 190 is held down by the operator until indexing is initiated. The output at line 218 initiates time out by the timer 248 and simultaneously energizes the solenoid 228 momentarily to initiate indexing by the motor 30. The motor 30 moves workpiece 26 to the proper position for machining of the first hole. At the first movement of work holder 20 during indexing, switch 32 moves to its normally closed position to maintain gate 188 on and maintain an output at line 204. Timer 248 will time out to provide an output at line 250 after a time interval sufficient to assure that indexing by motor 30 has been completed. The output at line 250 is applied to the gate 260 through line 258 and to the gate 294 through line 296. The gate 260 also receives an input at line 264 from the charged capacitor 270 to develop an output at line 284 and energize the refeed motor solenoid 288 and the clamp solenoid 110. When solenoid 110 is energized, the block 104 is raised so that the electrode wire 78 is free to move on the lower block 100. Solenoid 288 energizes the refeed motor 92 to drive the wheel 84 and wheels 82, 84 feed the electrode wire toward the workpiece 26 in a direction from right to left as viewed in FIG. 1. Motor 92 operates at a constant speed so that wheels 82, 84 provide a continuous linear feed of the electrode wire 78 which terminates after the electrode wire 78 advances to a precise predetermined relation to the workpiece 26 at which the capacitor 270 discharges through the gap between the wire and the workpiece. By way of illustration, with an 0.005-inch-diameter wire, motor 92 may operate at 0.1 r.p.m. so that the wire is fed at 0.002 of an inch per second. For this specific example a typical refeed of 0.008 inches requires approximately four seconds. Refeed termination just before the wire 78 touches the workpiece 26 is preferred so that wire 78 is not bent. Discharge of capacitor 270 removes the input from line 264 to turn gate 260 off and deenergize the solenoids 288, 110. When solenoid 288 is deenergized, the motor 92 stops to terminate refeeding. When solenoid 110 is deenergized the block 104 moves downwardly into tight engagement with the lower block 100 to firmly clamp the electrode wire 78.

Coincident with refeed initiation by gate 260, the gate 294 has inputs at its lines 296, 298 to provide an output at line 302 and initiate time out of the timer 306. The timer 306 will time out after an interval sufficient to assure that refeeding has been completed and when the timer times out the solenoid 310 is energized by the power switch 308. Other means are also contemplated to initiate operation of solenoid 310, such as an initiating signal derived from the deenergization of solenoids 110, 288 in the refeeding circuit. When the solenoid 310 is energized, contact 180 is closed to energize the coil 176 and a signal of the proper polarity is applied to the coil 176 so as to cause the cylinder 64 under the control of the servo valve 178 to move the carriage 40 forward and machine a hole in the workpiece 26. During machining a prescribed gap is maintained between the electrode wire 78 and the workpiece 26 by generally conventional operation of the servo valve 178 until the carriage 40 has moved forward to a position where the arm 58 actuates the forward travel limit switch 54.

When the switch is opened by the arm 58 the input on line 298 at the gate 294 is removed and the timer 306, switch 308, and solenoid 310 are turned off. When solenoid 310 is deenergized the contact 182 closes to energize the control coil 176 in the proper direction such that the servo valve 178 causes the cylinder 64 to retract the carriage 40. As soon as the carriage 40 reaches its rear travel limit, switch 56 is actuated by the stop 60 to close the contact 208 and provide an input at line 210 for the gate 206 to initiate the machining operation for the next hole in the manner described hereinabove. Before each hole is machined, a sufficient length of electrode wire 78 will be refed by the motor 92 and the rollers 82, 84 to replenish the wire that eroded during the previous machining operation. When workpiece 26 is moved into the index position for the last hole, the switch 32 is opened to remove the input at line 194 of the gate 188 and thus prevent further operation of the control after the last hole is machined and carriage 40 is retracted. In the preferred embodiment gates 188, 206, 212, 260, 294; timers 248, 306; and switches 220, 286, 308 are solid-state circuits.

FIGS. 7 and 8 illustrate an electrical discharge machining apparatus which is similar in many respects to the apparatus illustrated in FIGS. 1–6 but is modified so as to machine a hole whose diameter is greater than the diameter of the electrode and also machine holes of various sizes with the same electrode. The work indexing assembly 14 of FIG. 1 is replaced with a work-rotating machine 319 which includes a headstock 320 having a live spindle 322 on which a workpiece 324 is chucked for rotation about a horizontal axis 326 (FIG. 8). The headstock 320 is driven by a motor 327 and is electrically connected to the supply conductor 160 (FIGS. 7 and 9) by a brush assembly 328. The electrode assembly 330 is similar in many respects to the electrode assembly 16 (FIGS. 1–6) with like elements being designated by like reference numerals.

The electrode assembly has a rear guide 332 which is constructed similarly to the guide 80 (FIG. 1) except that it is mounted on the plate 72 by an inclined block 334 to position the electrode wire 78 along an inclined axis 336. A clamping device 338 is substantially similar to the clamping device 98 (FIG. 1) except that it is mounted on an inclined block 340 to position the wire electrode 78 on the inclined axis 336. A front guide 342 is fastened on the carriage 40 by a support 343 to be disposed forwardly of the clamping device 338. The guide 342 generally corresponds to the guide 120 (FIG. 1) except that guide 342 moves with the carriage 40 and is inclined to guide the electrode wire 78 on the inclined axis 336.

Disposed generally between the guide 342 and the work 324 is a precision gauge block 346 which is mounted on the bed (not shown) of the machine by a support 348. The support 348 is either formed of electrical insulation material or includes an electrical insulating segment (not shown). Preferable the support 348 is mounted on the bed for universal movement by suitable cross-slides (not shown) so that the position of the block 346 can be adjusted relative to wire 78 and workpiece 324. As shown in the enlarged view illustrated in FIG. 8 the gauge block 346 has a flat upper face 350 which is disposed vertically below the rotational axis 326 a distance exactly equal to one-half the diameter of a hole 352 that is to be machined in the workpiece 324. Additionally the gauge block 346 is positioned horizontally in close proximity to the exposed face 354 of the workpiece 324. The inclination of the electrode axis 336 as designated by the angle 356 is such that when the hole 352 has been completely machined the forward tip 358 of the electrode wire 78 can extend entirely through the workpiece 324 past a rear face 359 of the workpiece and the diameter of the hole at the front face 354 does not exceed the prescribed diameter. Stated differently machining should occur only at the tip 358 of the electrode wire 78.

To machine the hole 352 the wire electrode 78 is advanced by the refeeding wheels 82, 84 until the tip 358 is positioned on the flat face 350 of the gauge block 354 at which point refeeding is terminated and the wire is firmly clamped by the clamping device 338. The depth control limit switch 54 (FIG. 1) is then set so that the carriage 40 will advance until the electrode can machine the hole 352 to the proper diameter at the rear face 359. By way of illustration with the example shown in FIG. 9 the carriage 40 can advance a maximum distance designated by numeral 360 so that the tip 358 projects beyond the workpiece 324 to complete the hole 352 before a rearwardly portion of the wire causes unwanted machining at the front face 354. The hole 352 is then machined by advancing the carriage 40 and thus the electrode wire 78 while the workpiece 324 is rotated about the axis 326 by the spindle 322. The carriage 40 moves horizontally along an axis parallel to the rotational axis 326 while the electrode 78 is angularly disposed on the axis 356 so that the diameter of the hole will be greater than the diameter of the wire. Assuming that no erosion of the electrode 78 occurs during a machining operation, after the carriage 40 travels the distance 360, the tip 358 of the electrode 78 will project through the workpiece 324 and the diameter of the hole 352 will not exceed the prescribed diameter at the front face 354 of the workpiece 324. When the carriage 40 reaches its forward travel limit 360 the limit switch 54 is operated to retract the carriage 40. In an actual machining operation, however, erosion of the wire 78 at tip 358 will occur and thus after the carriage has advanced to the forward travel limit the front tip 358 will have eroded so that the electrode does not complete the machining of hole 352 in one pass. After the first pass the carriage 40 is retracted in response to actuation of the depth control limit switch 54 and complete machining of the hole 352 is accomplished by performing additional machining with successive passes of the wire 78 into the workpiece. After each pass the electrode wire 78 is refed until the front tip 358 of the electrode is disposed at the face 350 of gauge block 346 so that with each successive pass the hole 352 is machined deeper into the work 324 at the correct diameter. With electrical discharge machining apparatus of the type described in conjunction with FIGS. 7 and 8 it will be apparent that an electrode wire 78 of fixed given diameter can be used to machine holes of different diameters by using gauge blocks corresponding to gauge blocks 346 of different heights to properly position the front tip 358 of the wire electrode 78 and by properly selecting the forward travel of carriage 40.

It will be understood that the methods and apparatuses for electrical discharge machining which are herein described and disclosed are presented for purposes of explanation and illustration and are not intended to indicate limits of the present invention, the scope of which is defined in the following claims.

What is claimed is:

1. In electrical discharge machining apparatus, work-holding means for supporting a workpiece during a machining operation, carriage means for supporting an elongated electrode with one end of said electrode disposed in a first direction toward said work-holding means, means for moving said carriage generally in said first direction so as to move said electrode into said workpiece to machine said workpiece and for moving said carriage in an opposite direction to retract said electrode from said workpiece, electrode-feeding means for moving said electrode generally in said first direction relative to said carriage when said electrode is retracted from said workpiece, and control means for operating said apparatus and including feeding termination control means operative to sense a predetermined position of said electrode relative to said workpiece and terminate feeding of said electrode by said feeding means.

2. The apparatus set forth in claim 1 wherein said control means further comprises feeding initiation control means responsive to movement of said carriage means in said opposite direction to initiate operation of said electrode-feeding means.

3. The apparatus set forth in claim 1 wherein said control means further comprises carriage advance control means operable in response to operation of said feeding termination control means to initiate operation of said carriage-moving means to move said carriage toward said workpiece.

4. The apparatus set forth in claim 1 wherein said carriage means includes electrode-clamping means for preventing relative movement between said electrode and said carriage means and said control means further comprises clamp initiation means operable in response to operation of said feeding termination control means to operate said clamping means.

5. The apparatus set forth in claim 1 wherein said control means further comprises carriage retraction control means responsive to movement of said carriage and operable to initiate operation of said carriage-moving means in said opposite direction when machining of said workpiece by said electrode reached a predetermined depth.

6. The apparatus set forth in claim 1 wherein said electrode is a continuous length of electrode wire and said electrode feeding means comprises a pair of wheels rotatable about parallel axes, motor means for rotatably driving one of said wheels, said wheels having abutting peripheral portions so as to frictionally engage said wire, and said feeding termination means is operative to render said motor means inoperative in response to movement of said wire to said predetermined position.

7. The apparatus set forth in claim 6 wherein said control means further comprises feeding initiation control means operated by said carriage when said wire is retracted from said workpiece to render said motor means operative to rotate said one wheel and maintain said motor means operative to provide a continuous linear feeding of said wire until feeding is terminated by said feeding termination control means.

8. In electrical discharge machining apparatus, work holding and indexing means operable to support a workpiece during a machining operation and to index said workpiece between successive machining operations, carriage means for supporting an elongated electrode with one end of said electrode projecting from said carriage in a first direction toward said workpiece, carriage-moving means for moving said carriage toward said workpiece so as to move said electrode into said workpiece during a machining operation and for moving said carriage in an opposite direction to retract said electrode from said workpiece, feeding means on said carriage for moving said electrode relative to said carriage in said first direction toward said workpiece, control means operative to cause said work holding and indexing means to position said workpiece for a first machining operation, means responsive to said positioning of the workpiece operative to cause said feeding means to feed said electrode relative to said carriage, means responsive to movement of said electrode to a predetermined spaced relationship relative to said workpiece to terminate said feeding of the electrode, means responsive to said feeding termination to cause said carriage-moving means to advance said carriage in said first direction a predetermined distance, and switch means responsive to movement of said carriage said predetermined distance operable to cause said carriage-moving means to move said carriage in said opposite direction.

9. In electrical discharge machining apparatus having carriage means for supporting an elongated electrode and for moving said electrode toward and away from a workpiece during a machining operation, means operative between successive machining operations for moving said electrode toward said workpiece relative to said carriage means to replenish a length of electrode eroded during a prior machining operation, means responsive to movement of said electrode relative to said carriage means to sense a predetermined condition at a gap between said electrode and said workpiece and provide an indication when said predetermined condition occurs, and means responsive to said indication to terminate movement of said electrode relative to said carriage means.

10. In electrical discharge machining apparatus having carriage means for supporting an elongated electrode and for moving said electrode toward and away from a workpiece during a machining operation, means operative between successive machining operations for moving said electrode toward said workpiece relative to said carriage to replenish a length of electrode eroded during a prior machining operation comprising a pair of roller wheels mounted for rotation so that each wheel has a peripheral portion adjacent a peripheral portion of the other wheel, said electrode extending between said wheels with the peripheral portions of each wheel frictionally engaging said electrode, drive means for rotatably driving one of said wheels, spool means on said carriage rearwardly of said wheels, first guide means on said carriage forwardly of said wheels, and second guide means on said carriage between said spool means and said wheels, said electrode being in the form of a continuous wire wound about said spool means having a straight length which passes from said spool means through said second guide means and then between said wheels and then through said first guide means, said guide means supporting said straight length of said wire along an axis disposed obliquely to an axis along which said carriage moves during a machining operation.

11. In electrical discharge machining apparatus having carriage means for supporting an elongated electrode and for moving said electrode toward and away from a workpiece during a machining operation, means operative between successive machining operations for moving said electrode toward said workpiece relative to said carriage to replenish a length of electrode eroded during a prior machining operation comprising a pair of roller wheels mounted for rotation so that each wheel has a peripheral portion adjacent a peripheral portion of the other wheel, said electrode extending between said wheels with the peripheral portions of each wheel frictionally engaging said electrode, drive means for rotatably driving one of said wheels, and guide means mounted on said carriage to support said electrode with a straight forward end portion of said electrode extending along an axis oblique to an axis along which said carriage moves during a machining operation.

12. In electrical discharge machining apparatus for machining a hole or the like of predetermined diameter, a work-rotating machine for rotating a workpiece about a first axis, carriage means movable in opposite directions along a second axis parallel to said first axis so that said carriage means can move toward and away from said workpiece, an elongated electrode of a diameter less than said predetermined diameter, said electrode having a front end portion terminating in a tip, means on said carriage supporting said electrode on said carriage so that the longitudinal axis of said electrode portion is disposed obliquely to said first axis, feeding means on said carriage for feeding said electrode along said longitudinal axis toward said workpiece, and means operatively associated with said feeding means for terminating said feeding of said electrode at a position of said tip spaced radially from said first axis a distance substantially equal to one-half of said predetermined diameter.

13. Apparatus according to claim 12 wherein said last-mentioned means includes gauge block means having a surface spaced from said first axis a distance substantially equal to one-half said predetermined diameter, and sensing circuit means for sensing a position of said tip substantially engaged with said surface.

14. In electrical discharge machining structure, an electrode, and means for automatically feeding the electrode an amount after each operation of electrical discharge machining structure determined by the erosion of the electrode in the previous operation of the electrical discharge machining structure including apparatus for sensing electrical contact between the workpiece and electrode to determine the amount of electrode fed after each operation of the electrical discharge machining structure.

15. In electrical discharge machining structure, an electrode, means supporting said electrode, means for moving said supporting means with said electrode thereon during machining operation of said structure, and means for feeding said electrode relative to said supporting means an amount after each said machining operation corresponding to the amount of said electrode eroded during said operation including means for sensing electrical contact between the workpiece and the electrode.